United States Patent
Yang et al.

(10) Patent No.: US 10,232,477 B2
(45) Date of Patent: Mar. 19, 2019

(54) MACRO-MICRO INTEGRATED COMPOUND PLATFORM WITH ADJUSTABLE DYNAMIC CHARACTERISTICS

(71) Applicant: GUANGDONG UNIVERSITY OF TECHNOLOGY, Guangzhou (CN)

(72) Inventors: Zhijun Yang, Guangzhou (CN); Youdun Bai, Guangzhou (CN); Xin Chen, Guangzhou (CN); Jian Gao, Guangzhou (CN); Xindu Chen, Guangzhou (CN); Yunbo He, Guangzhou (CN); Yun Chen, Guangzhou (CN); Ruiqi Li, Guangzhou (CN); Chaoran Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 302 days.

(21) Appl. No.: 15/376,658

(22) Filed: Dec. 13, 2016

(65) Prior Publication Data
US 2017/0087677 A1  Mar. 30, 2017

Related U.S. Application Data

(63) Continuation of application No. PCT/CN2015/095409, filed on Nov. 24, 2015.

(30) Foreign Application Priority Data

Jun. 8, 2015  (CN) .......................... 2015 1 0312682

(51) Int. Cl.
*B23Q 1/25*  (2006.01)
*B25H 1/02*  (2006.01)
(Continued)

(52) U.S. Cl.
CPC ................. *B23Q 1/25* (2013.01); *B23Q 1/34* (2013.01); *B23Q 11/0039* (2013.01); *B25H 1/02* (2013.01)

(58) Field of Classification Search
CPC ... B23Q 1/03; B23Q 1/25; B23Q 1/75; B23Q 3/00; B23Q 3/06; B23Q 7/00
See application file for complete search history.

(56) References Cited

U.S. PATENT DOCUMENTS 5,839,324 A * 11/1998 Hara ................... G03F 7/70691
74/490.09
6,002,465 A * 12/1999 Korenaga ........... G03F 7/70691
355/53

(Continued)

*Primary Examiner* — Lee D Wilson
(74) *Attorney, Agent, or Firm* — W&K IP(Wayne & King)

(57) ABSTRACT

The present invention proposes a macro-micro integrated compound platform with adjustable dynamic characteristics. When a macro platform mover and a micro platform mover are driven at the same time, the whole large-scale high-speed motion can be realized; when a motion deviation occurs, a micro motion platform can be driven separately to realize the high-frequency motion deviation compensation, because the micro motion platform has small inertia and zero friction and achieves precision displacement output through elastic deformation. The macro-micro integrated compound platform can realize high-speed precision motion through compound motion control, is mounted and used in a manner consistent with the traditional platform, and is convenient to be popularized and applied; a stiffness and frequency adjustment mechanism and a variable damper are arranged, so that the micro motion platform can transfer the motion of a macro motion platform and isolate the vibration at any frequency, and realize high-precision displacement compensation; meanwhile, damping of the variable damper is matched with the stiffness and frequency parameters to (Continued)

ensure the high-precision displacement compensation at any frequency and increase the range of working frequency.

9 Claims, 4 Drawing Sheets

(51) Int. Cl.
*B23Q 1/34* (2006.01)
*B23Q 11/00* (2006.01)

(56) References Cited

U.S. PATENT DOCUMENTS

| | | | |
|---|---|---|---|
| 6,359,679 B1* | 3/2002 | Ito ......................... | G03B 27/62 |
| | | | 355/53 |
| 6,408,045 B1* | 6/2002 | Matsui ............... | G03F 7/70716 |
| | | | 355/53 |
| 7,221,433 B2* | 5/2007 | Binnard ................ | G03B 27/58 |
| | | | 310/10 |
| 8,888,083 B2* | 11/2014 | Hosaka ............... | B23Q 11/001 |
| | | | 269/55 |
| 2017/0087677 A1* | 3/2017 | Yang ....................... | B25H 1/02 |
| 2017/0126112 A1* | 5/2017 | Chen ....................... | B23Q 5/28 |
| 2017/0129180 A1* | 5/2017 | Coates .................. | B33Y 30/00 |
| 2018/0104779 A1* | 4/2018 | Yang .................. | B81C 1/00126 |

\* cited by examiner

MACRO-MICRO INTEGRATED COMPOUND PLATFORM WITH ADJUSTABLE DYNAMIC CHARACTERISTICS

CROSS-REFERENCE TO RELATED APPLICATIONS

This application is a continuation of International Patent Application No. PCT/CN2015/095409 with a filing date of Nov. 24, 2015, designating the United States, now pending, and further claims priority to Chinese Patent Application No. 201510312682.4 with a filing date of Jun. 8, 2015. The content of the aforementioned application, including any intervening amendments thereto, are incorporated herein by reference.

TECHNICAL FIELD

The present invention relates to a precision motion platform, in particular to a macro-micro integrated compound platform with adjustable dynamic characteristics.

BACKGROUND OF THE PRESENT INVENTION

With the progress of science and technology, people's requirements for products are increasingly high, so that manufacturers' requirements for the processing precision of the products are also increasingly high. In existing equipment, the stroke of a high-precision feeding motion platform is generally short, but the precision of ordinary macro motion equipment with a long stroke cannot meet the actual demands. If special long-stroke high-precision motion equipment is employed, the manufacturing cost of the products will be increased significantly. In view of the current situations, a motion platform, which can combine a long-stroke general-precision macro motion with a high-precision small-stroke micro motion to realize long-stroke high-precision feeding and has multiple directions, is more and more favored by the industry.

In the prior art: a stiffness-frequency-adjustable one-dimensional micro-motion platform based on a stress stiffening principle (the invention application number: 20141021405.0), a pre-stressed membrane is provided, wherein the frequency is adjustable; art intrinsic frequency of the micro motion platform can be adjusted before or during working according to different working conditions and driving frequencies; a flexible hinge amplification mechanism is canceled; a piezoelectric ceramic actuator is replaced with a voice coil motor; load conditions can be judged in real time through non-contact drive and displacement measurement; the frequency of a drive mechanism can be adjusted dynamically according to the change of the load conditions; and the intelligent matching of dynamic characteristics can be realized. Because not enough damping is applied, the vibration amplitude of a resonance region of the mechanism may be uncontrollable, so that the micro motion platform cannot work at any frequency point and needs to avoid a resonance point through adjustment, thereby limiting the range of the working frequency. An anti-resonance structure is added in the invention, so that the micro motion platform can work at any frequency point without generating infinite vibration amplitude and can work in any frequency band without avoiding the resonance point, while realizing the long-stroke high-precision one-dimensional macro-micro motion and the feeding at any working frequency.

SUMMARY OF PRESENT INVENTION

An objective of the invention is to propose a macro-micro integrated compound platform with adjustable dynamic characteristics and capable of working at any frequency point, wherein the macro-micro integrated compound platform can realize high-speed precision motion through compound motion control; a variable damper is arranged, so that a micro motion platform can transfer the motion of a macro motion platform and isolate the vibration at any frequency, and realize high-precision displacement compensation; meanwhile, damping of the variable damper is matched with the stiffness and frequency parameters to realize the controllable vibration amplitude of a resonance region and increase the range of working frequency.

In order to achieve the objective, the invention adopts a technical solution as follows:

A macro-micro integrated compound platform with adjustable dynamic characteristics comprises a base, a macro motion outer frame and a micro motion platform;

the macro motion outer frame and the micro motion platform form an integrated platform; the micro motion platform is arranged inside a frame of the macro motion outer frame; the micro motion platform comprises a core platform for placing workpieces, elastic piece groups for limiting displacement, a variable damper for resisting resonance and a displacement sensor for detecting one-dimensional micro-displacement of the core platform; the core platform is connected to the macro motion outer frame through the elastic piece groups; the displacement sensor is arranged on the core platform and has a displacement measurement direction consistent with a feeding direction of the core platform: the variable damper is arranged between the macro motion outer platform and the micro motion platform and is respectively connected with the macro motion outer frame and the micro motion platform;

a guide rail, a slide block and a U-shaped linear motor are arranged on the base; the slide block can slide on the guide rail; the U-shaped linear motor comprises a stator, a macro motion outer frame mover, a micro motion platform mover and a connecting piece; the macro motion and the micro motion share the same stator;

the macro motion outer frame is fixedly mounted on the slide block and is connected with the macro motion outer frame mover through the connecting piece; and the macro motion outer frame mover, the micro motion platform mover and the stator control the macro motion outer frame to slide on the guide rail, thereby realizing the macro motion;

the core platform is fixed to the micro motion platform mover through the connecting piece; and the micro motion platform mover controls the micro motion of the core platform on the stator.

As is further illustrated, the variable camper is an extrusion damper or an electric/magnetorheological damper.

As is further illustrated, the variable damper shearing damper.

As is further illustrated, the elastic piece groups, the core platform and the macro motion outer frame are made into an integrated structure.

As is further illustrated, both sides of the core platform are connected with an inner wall of the macro motion outer frame through the elastic piece groups; and the elastic piece groups are arranged in parallel and have a length direction perpendicular to a motion direction of the core platform.

As is further illustrated, a groove is formed in a connecting part of the macro motion outer frame and the elastic piece groups, so that thinner deformable elastic members are formed inside the macro motion outer frame; and a frequency adjustment mechanism for adjusting a deformation degree of the elastic members is erected on the macro motion outer frame.

As is further illustrated, the frequency adjustment mechanism is a bolt penetrating through the groove and having both ends respectively connected to both sides of the groove.

As is further illustrated, the frequency adjustment mechanism comprises a connecting rod penetrating through the groove and a piezoelectric ceramic actuator for adjusting dynamics of preload force; a linear motion direction of the piezoelectric ceramic actuator is a pre-deformation direction of the elastic piece groups; the piezoelectric ceramic actuator is used for dynamically adjusting the preload force of the elastic piece groups and further adjusting dynamic characteristics of the micro motion platform.

As is further illustrated, the displacement sensor a differential capacitance sensor or a photoelectric sensor.

The present invention proposes the macro-micro integrated compound platform with adjustable dynamic characteristics. When the macro platform mover and the micro platform mover are driven at the same time, the whole large-scale high-speed motion can be realized; and when a motion deviation occurs, the micro motion platform can be driven separately to realize the high-frequency motion deviation compensation, because the micro motion platform has small inertia and zero friction and achieves precision displacement output through elastic deformation. The macro-micro integrated compound platform can realize high-speed precision motion through compound motion control, is mounted and used in a manner consistent with the traditional platform, and is convenient to be popularized and applied; a stiffness and frequency adjustment mechanism and the variable damper are arranged, so that the micro motion platform can transfer the motion of a macro motion platform and isolate the vibration at any frequency, and realize high-precision displacement compensation; and meanwhile, the damping of the variable damper is matched with the stiffness and frequency parameters to the controllable vibration amplitude of the resonance region and increase the range of working frequency.

Figure 1:
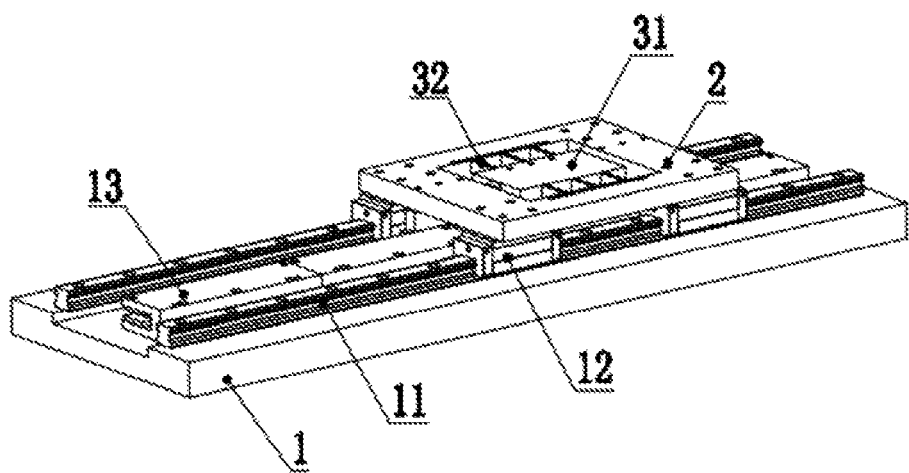
FIG. 1 is a structural schematic diagram of an embodiment of the present invention.

In the figures: a base 1, a macro motion outer frame 2, a micro motion platform 3, a core platform 31, elastic piece groups 32, a guide rail 11, a slide block 12, a U-shaped linear motor 13, a stator 131, a macro motion outer frame mover 132, a micro motion platform mover 133, a connecting piece 134, a groove 33, a displacement sensor 34, a variable damper 35, elastic members 21, a frequency adjustment mechanism 22, a bolt/connecting rod 221 and a piezoelectric ceramic actuator 222.

DETAILED DESCRIPTION OF PREFERRED EMBODIMENTS

The technical solution of the present invention is further described below in combination with the drawings through specific embodiments.

Figure 2:
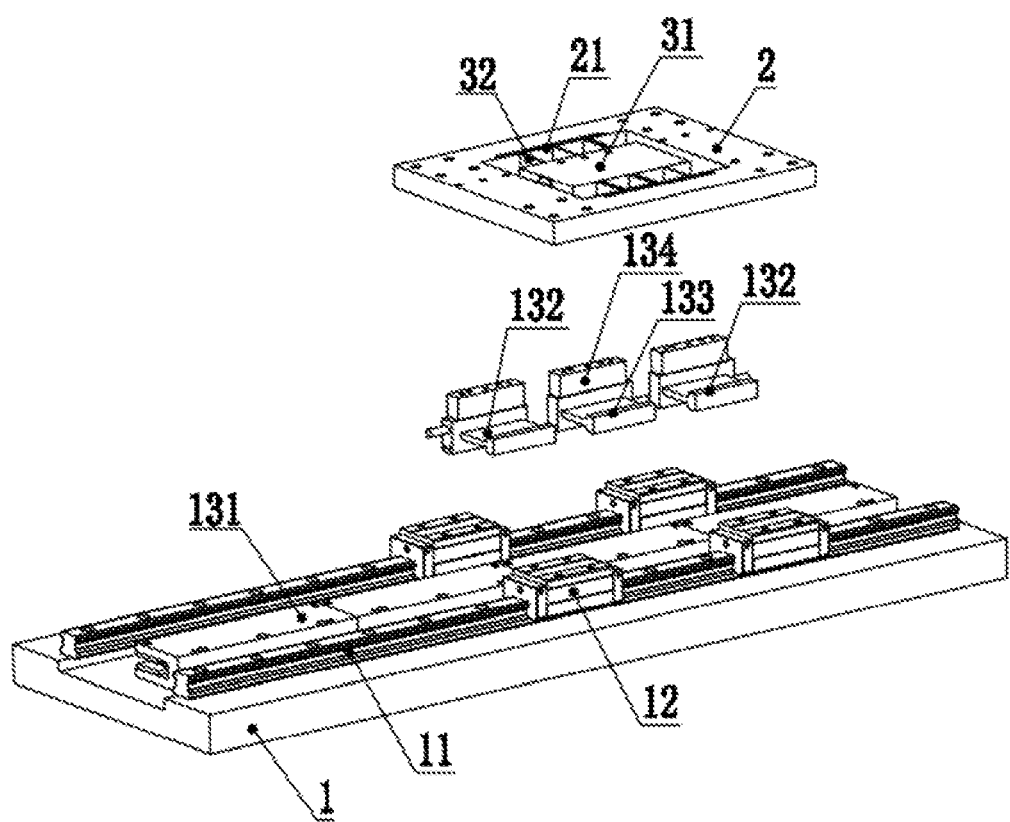
FIG. 2 is a structural schematic diagram of an embodiment of the present invention.
Figure 3:
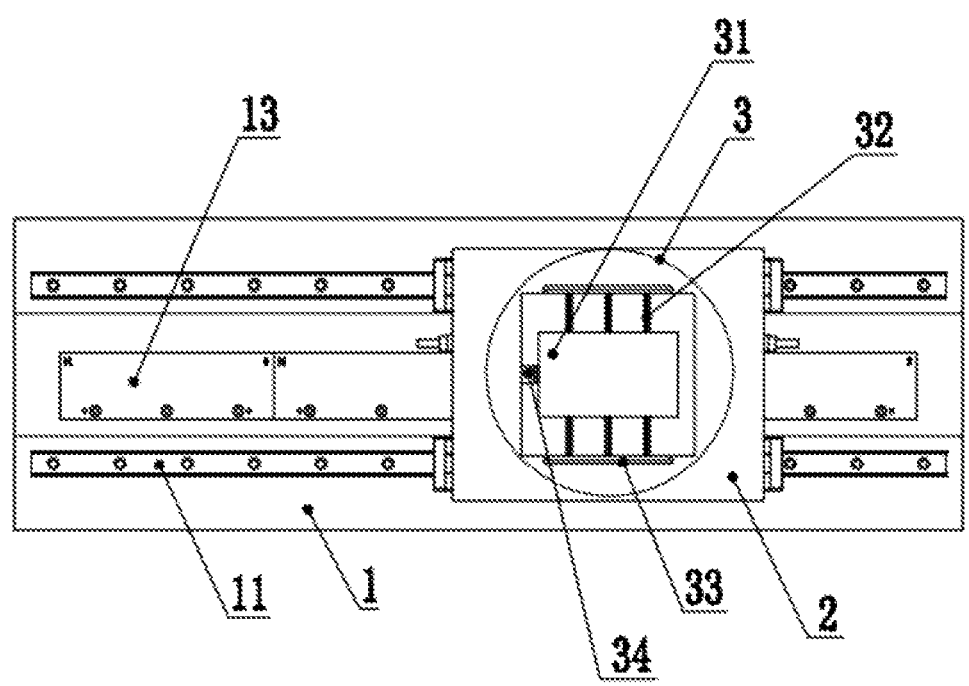
FIG. 3 is a top view of an embodiment of the present invention.

As shown in FIG. 1, FIG. 2 or FIG. 3, a damping type macro-micro integrated compound platform comprises the base 1, the macro motion outer frame 2 and the micro motion platform 3;

the macro motion outer frame 2 and the micro motion platform 3 form an integrated platform; the micro motion platform 3 is arranged inside a frame of the macro motion outer frame 2; the micro motion platform 3 comprises the core platform 31 for placing workpieces, the elastic piece groups 32 for limiting displacement, the variable damper 34 for resisting resonance and the displacement sensor 36 for detecting micro-displacement of the core platform 31; the core platform 31 is connected to the macro motion outer frame 2 through the elastic piece groups 32; the variable damper 34 is arranged between the macro motion outer platform 2 and the core platform 31, is respectively connected with the macro motion outer frame 2 and the core platform 31 in the micro motion platform 3, and generates a damping force acting on the core platform 31; and the displacement sensor 35 is arranged inside the variable damper 34;

the guide rail 11, the slide block 12 and the U-shaped linear motor 13 are arranged on the base 1; the slide block 12 can slide on the guide rail 11; the U-shaped linear motor 13 comprises the stator 131, the macro motion outer frame mover 132, the micro motion platform mover 133 and the connecting piece 134; and the macro motion and the micro motion share the same stator 131;

the macro motion outer frame 2 is fixedly mounted on the slide block 13 and is connected with the macro motion outer frame mover 132 through the connecting piece 134; and the macro motion outer frame over 132, the micro motion platform mover 133 and the stator 121 control the macro motion outer frame to slide on the guide rail 11, thereby realizing the macro motion;

the core platform 31 is fixed to the micro motion platform mover 133 through the connecting piece 134; and the micro motion platform mover 133 controls the micro motion of the core platform on the stator 131.

The one-dimensional macro-micro motion is realized on the basis of the U-shaped linear motor 12; a long-stroke motion range can be realized; the inertia is small; the response speed is fast; the one-dimensional macro-micro motion comprises the adjustment of macro motion long stroke of the macro motion outer frame 2 and also comprises the precision positioning of the micro-motion platform 3 on the micro-motion, so that the macro-micro integrated compound platform with adjustable dynamic characteristics can realize precise mobile positioning within a wide range.

Figure 4:
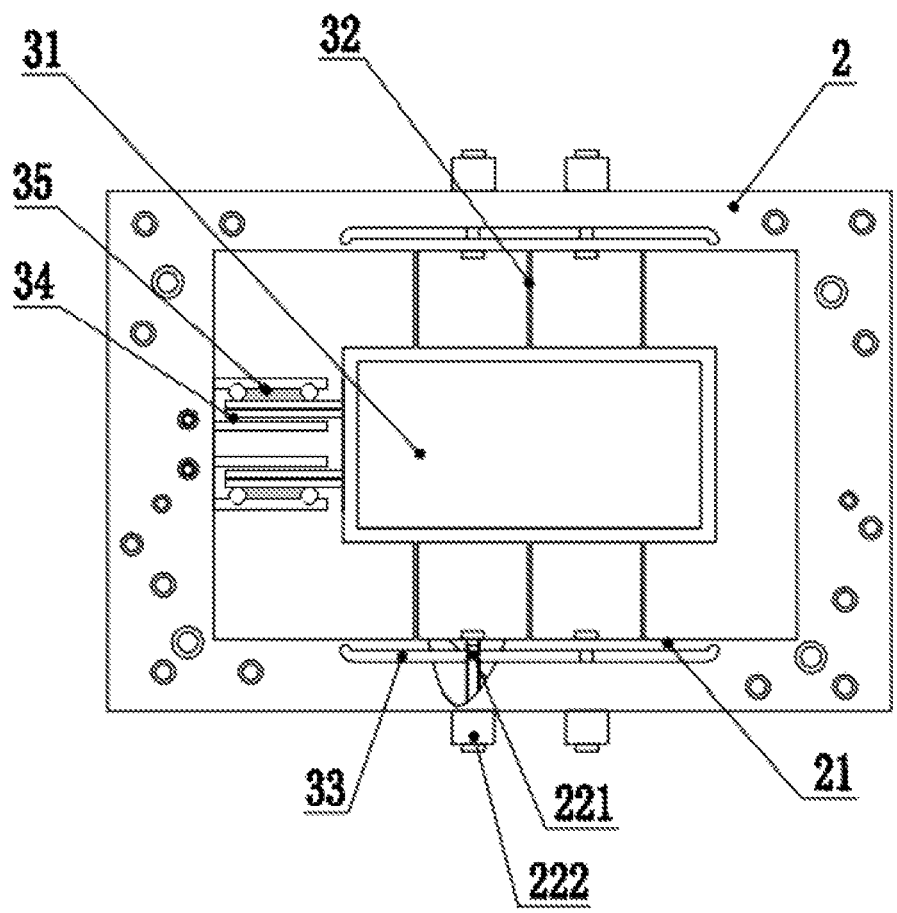
FIG. 4 is a structural schematic diagram of an integrated platform according to an embodiment of the present invention.

As shown in FIG. 4, the variable damper 35 is arranged on the displacement sensor 34 for connecting the macro motion outer frame 2 with the core platform 31; the variable damper 35 plays a role of avoiding infinite frequency when a resonance is produced, so that the micro motion platform 3 can work in any frequency range, without avoiding the resonance point through adjustment, thereby increasing the range of working frequency. In addition, the variable damper 35 uses the displacement sensor 34 connected between the macro motion outer frame 2 and the core platform 31 as a carrier, to reduce an independent connection structure of the entire micro motion platform with adjustable dynamic characteristics, reduce the influence of the decrease of the range of micro motion frequency due to the increase of the connection structure, and ensure a maximum range of working frequency. Meanwhile, the damping of the variable damper 35 is matched with the stiffness and frequency parameters to act as a vibration isolator and a low-pass filter.

As is further illustrated, the variable damper 35 is an extrusion damper or an electric/magnetorheological damper. The extrusion damper has large damping, can be fixedly encapsulated, has no leakage, and is easy to realize.

As is further illustrated, the variable damper 35 is a shearing damper. The shearing damper has good linearity and is easy to control.

As further illustrated, the elastic piece groups 32, the core platform 31 and the macro motion outer frame 2 are made into an integrated structure. The macro motion outer frame 2 and the micro motion platform 3 are designed integrally, so that the structure is compact and is obtained by performing milling, electric-spark machining and the like on a monoblock material, to avoid the assembly error of parts and improve the motion precision of platforms.

As is further illustrated, both sides of the core platform 31 are connected with the inner wall of the macro motion outer frame 2 through the elastic piece groups 32; the elastic piece groups 32 are arranged in parallel and have a length direction perpendicular to a motion direction of the core platform 31. The elastic piece groups 32 arranged in parallel effectively limit the one-dimensional motion of the core platform 31; and the motion of the core platform 31 in a non-feeding direction, is suppressed under the containment of the elastic piece groups 32.

As is further illustrated, the groove 33 is formed in a connecting part of the macro motion outer frame 2 and the elastic piece groups 32, so that thinner deformable elastic members 21 are formed inside the macro motion outer frame 2; a frequency adjustment mechanism 22 for adjusting a deformation degree of the elastic members 21 is erected on the macro motion outer frame 2. An intrinsic frequency of the mechanism in the micro motion can be changed by changing the tightness of the elastic piece groups 32 through the frequency adjustment mechanism 22, thereby changing motion characteristics of the core platform 31.

As is further illustrated, the frequency adjustment mechanism 22 is a bolt 221 penetrating through the groove 33 and having both ends respectively connected to both sides of the groove 33. The displacement generated in the length direction can be manually adjusted through the bolt 221 to change the deformation degree of the elastic members 21, thereby changing the tension of elastic pieces of the elastic piece group 32 and dynamically adjusting the intrinsic frequency of the structure of the platform.

As is further illustrated, the frequency adjustment mechanism 22 comprises a connecting rod 221 penetrating through the groove 33 and a piezoelectric ceramic actuator 222 for adjusting dynamics of preload force. A linear motion direction of the piezoelectric ceramic actuator 222 is a pre-deformation direction of the elastic piece groups 32. The piezoelectric ceramic actuator 222 can produce displacement in the length direction of the connecting rod 221 under the action of an applied voltage, and change the deformation degree of the elastic members 21, thereby changing the tension of the elastic pieces of the elastic piece group 32 and dynamically adjusting the intrinsic frequency of the structure of the platform.

As is further illustrated, the displacement sensor 34 is a differential capacitance sensor or a photoelectric sensor. The differential capacitance sensor has less mechanical displacement, high precision and better anti-interference performance; and the photoelectric sensor has the advantages of high precision, fast response, no contact, simple structure and small size, etc. Both of them can be used as the displacement sensor.

The technical principle of the present invention is described above in combination with specific embodiments These descriptions are only used to explain the principle of the present invention, rather than limiting the protection scope of the present invention in any form. Based on the explanation herein, those skilled in the art can contemplate other specific implementation ways of the present invention without contributing creative effort, and these implementation ways will fall within the protection scope of the present invention.

We claim:

1. A macro-micro integrated compound platform with adjustable dynamic characteristics, characterized by comprising a base, a macro motion outer frame and a micro motion platform;

the macro motion outer frame and the micro motion platform form an integrated platform; the micro motion platform is arranged inside a frame of the macro motion outer frame; the micro motion platform is a core platform for placing workpieces, elastic piece groups for support and displacement output, a variable damper for resisting resonance and, a displacement sensor for detecting micro-displacement of the core platform; the core platform is connected to the macro motion outer frame through the elastic piece groups; the displacement sensor is arranged on the core platform and has a displacement measurement direction consistent with a feeding direction of the core platform; the variable damper is arranged between the macro motion outer platform and the micro motion platform and is respectively connected with the macro motion outer frame and the micro motion platform;

a guide rail, a slide block and a U-shaped linear motor are arranged on the base; the slide block can slide on the guide the U-shaped linear motor comprises a stator, a macro motion outer frame mover, a micro motion platform mover and a connecting piece; the macro motion and the micro motion share the same stator;

the macro motion outer frame is fixedly mounted on the slide block and is connected with the macro motion outer frame mover through the connecting piece; the macro motion outer frame mover, the micro motion platform mover and the stator control the macro motion outer frame to slide on the guide rail, thereby realizing the macro motion; and the core platform is fixed to the micro motion platform mover through the connecting piece; and the micro motion platform mover controls the micro motion of the core platform on the stator.

2. The macro-micro integrated compound platform with adjustable dynamic characteristics according to claim 1, characterized in that the variable damper is an extrusion damper or an electrics damper.

3. The macro-micro integrated compound platform with adjustable dynamic characteristics according to claim 1, characterized in that the variable damper is a shearing damper.

4. The macro-micro integrated compound platform with adjustable dynamic characteristics according to claim 1, characterized in that the elastic piece groups, the core platform and the macro motion outer frame are made into an integrated structure.

5. The macro-micro integrated compound platform with adjustable dynamic characteristics according to claim 1, characterized in that both sides of the core platform are connected with an inner wall of the macro motion outer frame through the elastic piece groups; and the elastic piece groups are arranged in parallel and have a length direction perpendicular to a motion direction of the core platform.

6. The macro-micro integrated compound platform with adjustable dynamic characteristics according to claim 5, characterized in that a groove is formed in a connecting part of the macro motion outer frame and the elastic piece groups, so that thinner deformable elastic members are formed inside the macro motion outer frame; and a frequency adjustment mechanism for adjusting a deformation degree of the elastic members is erected on the macro motion outer frame.

7. The macro-micro integrated compound platform with adjustable dynamic characteristics according to claim 6, characterized in that the frequency adjustment mechanism is a bolt penetrating through the groove and having both ends respectively connected to both sides of the groove.

8. The macro-micro integrated compound platform with adjustable dynamic characteristics according to claim characterized in that the frequency adjustment mechanism comprises a connecting rod penetrating through the groove and a piezoelectric ceramic actuator for adjusting dynamics of preload force; and a linear motion direction of the piezoelectric ceramic actuator is a pre-deformation direction of the elastic piece groups.

9. The macro-micro integrated compound platform with adjustable dynamic characteristics according to claim 1, characterized in that the displacement sensor is a differential capacitance sensor or a photoelectric sensor.

* * * * *